(12) United States Patent
Arora et al.

(10) Patent No.: US 12,493,101 B2
(45) Date of Patent: Dec. 9, 2025

(54) LOCATION IDENTIFICATION BASED ON A LOCATION IDENTIFICATION FEATURE

(71) Applicant: ARRIS Enterprises LLC, Suwanee, GA (US)

(72) Inventors: Deepika Arora, Karnataka (IN); Balaji Vinayagam, Chennai (IN); Dileep Devaraj, Karnataka (IN)

(73) Assignee: ARRIS ENTERPRISES LLC, Horsham, PA (US)

( * ) Notice: Subject to any disclaimer, the term of this patent is extended or adjusted under 35 U.S.C. 154(b) by 530 days.

(21) Appl. No.: 17/952,649

(22) Filed: Sep. 26, 2022

(65) Prior Publication Data

US 2023/0110016 A1  Apr. 13, 2023

Related U.S. Application Data

(60) Provisional application No. 63/253,196, filed on Oct. 7, 2021.

(51) Int. Cl.
*G01S 5/10* (2006.01)
*G01S 5/02* (2010.01)
*H04W 64/00* (2009.01)

(52) U.S. Cl.
CPC .............. *G01S 5/10* (2013.01); *G01S 5/0236* (2013.01); *H04W 64/003* (2013.01)

(58) Field of Classification Search
CPC ...... G01S 5/10; G01S 5/0236; H04W 64/003; H04W 64/00; H04W 88/08
See application file for complete search history.

(56) References Cited

U.S. PATENT DOCUMENTS

| 8,787,944 B2 * | 7/2014 | Smith | H04W 4/026 |
| | | | 455/519 |
| 2012/0108266 A1 * | 5/2012 | Clark | H04W 4/02 |
| | | | 455/456.3 |
| 2012/0258733 A1 * | 10/2012 | Fischer | G01S 5/04 |
| | | | 455/456.1 |

(Continued)

OTHER PUBLICATIONS

International Search Report and the Written Opinion of the International Searching Authority dated Feb. 6, 2023 in International (PCT) Application No. PCT/US2022/044698.

(Continued)

*Primary Examiner* — Kabir A Timory
(74) *Attorney, Agent, or Firm* — Wenderoth, Lind & Ponack, L.L.P.

(57) ABSTRACT

An access point device and a cellular communications system can support one or more location identifier features such that the cellular communications system can provide the access point device with one or more location parameters. The location parameters are indicative of a location of the access point device. The access point device can use the one or more location parameters to determine a location of the access point device. By knowing a location of the access point device, the access point device can determine a location for each client device connected to the access point device. In this way, a more accurate location can be determined by the access point device such that the location of any one or more client devices connected to the access point device can be provided so as to, for example, conserve resources and improve quality of service.

20 Claims, 4 Drawing Sheets

(56) References Cited

U.S. PATENT DOCUMENTS

2018/0063680 A1\* 3/2018 Bitra ................... G01S 5/02521
2020/0053638 A1    2/2020 Edge et al.

OTHER PUBLICATIONS

International Preliminary Report on Patentability issued Apr. 9, 2024 in corresponding International (PCT) Patent Application No. PCT/US2022/044698.

\* cited by examiner

LOCATION IDENTIFICATION BASED ON A LOCATION IDENTIFICATION FEATURE

BACKGROUND

Location of users and/or client devices is increasingly becoming critical to providing a user with an expected network experience. Such location services have become relevant in almost all types of environments including those that include news delivery applications, fast moving customer goods (FMCG) portals, social media services, etc. Generally, current location systems do not provide the accuracy required to adequately locate a user associated with a client device so as to provide the user with the expected experience. For example, while using global positioning system (GPS) provides an accurate or expected outdoor location, such has not proven to be reliable for indoor locations such as a workspace, a retail space, a home, an indoor public space, such as an arena, etc., and many devices may not be GPS-capable. Thus, there is a need to provide an improved or enhanced location identification that more accurately and reliably provides a location of a client device, for example, associated with a user or any object.

SUMMARY

According to aspects of the present invention, an improved determination or identification of a location of a client device is provided. Locating a client device, such as associated with a user or other object, is becoming more and more critical as users and client devices are constantly transitioning from one location to another. Accurately locating a client device has become relevant in almost all types of services and environments. The present invention provides an improved determination or identification of a location for a client device so as to improve an overall experience for a user, collect relevant user data so as to provide enhanced service to the user, locate a lost client device, engage a user with customized notifications or targeted information and thus increase revenue by enhancing overall customer satisfaction while decreasing misinformation, confusing, or non-relevant information, enhance multiple system operator (MSO) applications (such as to provide selective distribution of messages, firmware upgrades, and/ or other services), and/or quality of experience of the user. For example, the present disclosure provides an improved determination of a location of a client device so as to allow for the sending of accurate and relevant information or data to a mobile or fixed wireless access (FWA) client device, such as inclement weather warnings (a warning can be sent to only those devices within a range of impact of the inclement weather), an appointment reminder (the reminder can be related to a particular area or zone), planned outage warning (the warning can be sent to only those client devices identified within a particular zone instead of the entire coverage area), any other push notification, or any combination thereof.

Any Internet protocol or wireless device can be a potential source for providing information or data relevant to the identification of the location of a client device. Such information or data can vary greatly in terms or reliability or accuracy. For example, a location of a client device can vary from a few meters to several hundred meters depending on the methodology used, location of the client device, and mobility of the client device. For example, to locate an outdoor stationary client device, GPS is accurate. However, for an indoor stationary client device, accuracy of GPS is not as reliable. The present disclosure utilizes one or more inherent long term evolution (LTE) features, referred to herein as one or more location identification features, to provide more reliable and accurate mapping of the location of a client device especially where the client device is not LTE-capable. Using such one or more location identification features provides an improved pace for addressing user issues (such as one or more customer issues), conserves resources (such as time for resolution, costs associated with correctly identifying a location, etc.), and general user satisfaction. By enabling a location identification feature of LTE in an access point device within a network environment provides improved location identification of a client device even if the client device is not an LTE capable device. The access point device can act as an LTE capable gateway which in turn can be used to find the accurate location of a client device attached to the access point device which otherwise would not be locatable (for example, any of a laptop, a desktop, a smart television, a smart assistant, a smart speaker, an Internet of things (IoT) device, any other network device, or any combination thereof.

An aspect of the present disclosure is drawn to a method for an access point device to provide a location device connected to the access point device. The method comprises connecting to a cellular communications system, wherein the access point device and the cellular communications system supports one or more location identification features, determining that a location identification feature from the one or more location identification features is enabled, receiving one or more location parameters associated with a location of the access point device from the cellular communications system based on the location identification feature, determining the location of the client device based on the one or more location parameters, and providing the location of the client device.

In an aspect of the present disclosure, the method is such that the cellular communications system comprises a long term evolution (LTE) system.

In an aspect of the present disclosure, the method is such that the location identification feature indicates support for an observed time difference of arrival (OTDOA) process.

In an aspect of the present disclosure, the method further comprises receiving client device information associated with the client device from the client device, associating the location with at least a portion of the client device information, and storing the location and the at least the portion of the client device information.

In an aspect of the present disclosure, the method is such that the client information comprises at least one of a serial number, a customer name, a registered address, a current address, a data volume, a media access control (MAC) address, a device type, and a device name.

In an aspect of the present disclosure, the method is such that storing the location and the at least the portion of the information comprises sending at least one of the one or more location parameters and the at least the portion of the client device information to a network resource connected to the access point device.

In an aspect of the present disclosure, the method is such that determining the location comprises receiving from a management server the location based on the one or more location parameters.

An aspect of the present disclosure is drawn to an access point device for providing a location of a client device. The access point device comprises a memory storing one or more computer-readable instructions, and a processor connected to the memory. The processor is configured to execute the one or more computer-readable instructions to a cellular communications system, wherein the access point device and the cellular communications system supports one or more location identification features, determine that a location identification feature from the one or more location identification features is enabled, receive one or more location parameters associated with a location of the access point device from the cellular communications system based on the location identification feature, determine the location of the client device based on the one or more location parameters, and provide the location of the client device.

In an aspect of the present disclosure, the cellular communications system comprises a long term evolution (LTE) system.

In an aspect of the present disclosure, the location identification feature indicates support for an observed time difference of arrival (OTDOA) process.

In an aspect of the present disclosure, the processor is further configured to execute the one or more computer-readable instructions to receive client device information associated with the client device from the client device, associating the location with at least a portion of the client device information, and storing the location and the at least the portion of the client device information.

In an aspect of the present disclosure, the client information comprises at least one of a serial number, a customer name, a registered address, a current address, a data volume, a media access control (MAC) address, a device type, and a device name.

In an aspect of the present disclosure, storing the location and the at least the portion of the information comprises sending at least one of the one or more location parameters and the at least the portion of the client device information to a network resource connected to the access point device.

In an aspect of the present disclosure, determining the location comprises receiving from a management server the location based on the one or more location parameters.

An aspect of the present disclosure provides a non-transitory computer-readable medium of an access point device having one or more computer-readable instructions stored thereon. The one or more computer-readable instructions when executed by a processor of the access point device, cause the access point device to perform one or more operations including the steps of the methods described herein.

BRIEF DESCRIPTION OF THE DRAWINGS

Like reference numbers and designations in the various drawings indicate like elements.

DETAILED DESCRIPTION

Figure 1:
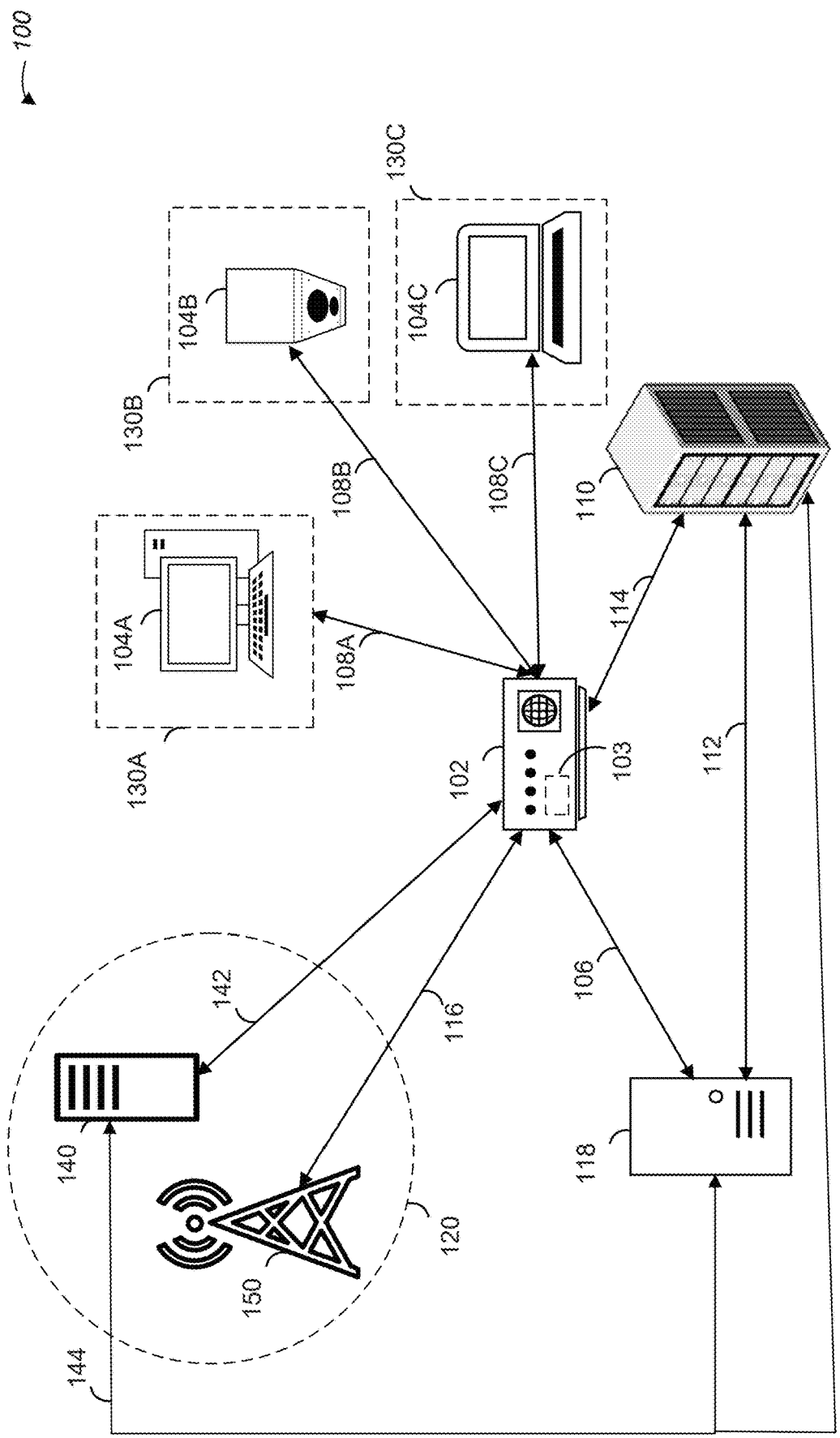
FIG. 1 is a diagram of a network environment, according to one or more aspects of the present disclosure.

With the advent of mobility of client devices, especially those associated with a user, there is a need for an improved determination of a location of a client device based on providing a location of a client device using or based on location identification features of a cellular communications system, including, but not limited to, an LTE system and/or a 5G system. The location identification features can comprise any of observed time difference of arrival (OTDOA), cell identification (CID), enhanced cell identification (E-CID), assisted global navigation satellite system (A-GNSS), and any combination thereof. While the present disclosure contemplates using any location identification feature of a cellular communications system, OTDOA can provide an improved accuracy over other location identification features.

Cellular coverage is provided by one or more cells that are typically an area of coverage of a radio frequency (RF) antenna mounted on a base station. A cell is identified by a CID. A location of a client device can be determined based on a CID of the cell within which the client device is located. With CID the position accuracy is linked to the cell size, as the location server is only aware that the client device is served by the base station. This CID information can be communicated or transmitted to an access point device for use in a determination of a location of a client device connected to the access point device as discussed with reference to FIGS. 1-4 herein.

E-CID is defined mainly for devices where no global navigation satellite system (GNSS) receiver has been integrated. On top of using the knowledge of the geographical coordinates of the service base station (as is done in CID), the position of a device, such as an access point device, is estimated more accurately by performing measurements on radio signals. E-CID can be implemented by estimating the distance from a single base station, measuring the distance from three base stations, or by measuring the angle-of-arrival from at least a plurality of base stations. For example reference signal received power (RSRP) (a standard quality measurement for Release 8 terminals), a time difference of arrival (TDOA) and the measurement of the timing advance (TADV) or the round trip time (RTT) can be used. This E-CID information can be communicated or transmitted to an access point device for use in a determination of a location of a client device connected to the access point device as discussed with reference to FIGS. 1-4 herein.

OTDOA is a mobile service downlink (DL) positioning method defined in the $3^{rd}$ generation partnership project (3GPP) standard. The OTDOA feature provides one or more reference signal time difference (RSTD) measurements conducted on downlink positioning reference signals received from multiple locations, where the client device location identification is calculated by multilateration, also referred to as hyperbolic positioning, in which the access point device measures the time of arrival (TOA) of signals received from multiple eNodeBs. The TOAs from a plurality of neighboring eNodeBs, such as $TOA_1$ associated with $eNodeB_1$, $TOA_2$ associated with $eNodeB_2$, and $TOA_3$ associated with $eNodeB_3$, are subtracted from the TOA of a reference ENodeB to form the OTDOA. Geometrically, each TOA determines a hyperbola, and the point at which the hyperbolas intersect is the location of the access point device. For example, at least three time measurements from geographically dispersed eNodeBs with good geometry are needed to solve for two coordinates (latitude and longitude) of the access point device. Performance is improved via incorporation of additional eNodeBs. The access point device measures three TOAs relative to the access point device internal time base, for example, a first TOA ($\tau_1$), a second TOA ($\tau_2$) and a third TOA ($\tau_3$) corresponding to a first $eNodeB_1$, a second $eNodeB_2$, and a third $eNodeB_3$, respectively. The measurement from eNodeB$_1$ can be selected as a reference and two OTDOAs are formed as TOA$_2$, 1=$\tau_2$-$\tau_1$ and TOA$_3$, 1=$\tau_3$-$\tau_1$. This OTDOA information can be communicated or transmitted to an access point device for use in a determination of a location of a client device connected to the access point device (based on the intersection of the hyperbolas) as discussed with reference to FIGS. 1-4 herein.

Using time measurements from any of the location identification features in LTE provides an enhanced or improved user experience by providing an access point device with information so as to determine an accurate and/or reliable location of the client device connected to the access point device.

FIG. 1 is a diagram of a network environment 100, according to one or more aspects of the present disclosure. The network environment 100 comprises an access point device 102, one or more client devices 104 (for example, one or more client devices 104A, 104B, and 104C), a database server 118 and a management server 110. In one or more embodiments, a client device 104 can be any type of network device that connects to an access point device 102, for example, a hand-held computing device, personal computers (such as desktop 104A and laptop 104C), electronic tablets, mobile phones, smart phones, smart speakers, Internet-of-Things (IoT) device (such as smart assistant 104B), iControl devices, portable music players with smart capabilities capable of connecting to the Internet, cellular networks, and interconnecting with other devices via Wi-Fi and Bluetooth (BT), other wireless hand-held consumer electronic devices, or any combination thereof. A client device 104 can be connected to the access point device 102 via a wireless connection 108, for example, client devices 104A, 104B and 104C can connect to the access point device 102 via connections 108A, 108B, and 108C, respectively. Client devices 104A, 104B and 104C can be distributed or positioned at one or more locations 130A, 130B and 130C, respectively. Each location 130A, 130B and 130C is within a proximity of the access point device 102 such that the access point device 102 can communicate with the one or more corresponding client devices 104A, 104B and 104C. In one or more embodiments, the access point device 102 can connect directly or indirectly to one or more client devices 104, for example, the access point device 102 can connect via an extender access point or other network device.

The access point device 102 can comprise, for example, an access point and/or a hardware electronic device that may be a combination modem and gateway that combines the functions of a modem, an access point (AP), and/or a router, or any combination thereof. The access point device 102 can, for example, be a residential gateway, a home network gateway, or a wireless access point that includes one or more location identification features 103. The access point device 102 can be communicatively coupled to a cellular communications system 120 that provides service for a 6G network, a 5G network, a 3G network, an LTE network, or any other cellular network that includes one or more location identification features capability, for example, corresponding to the one or more location identification features 103, so as to provide location information, including but not limited to one or more measurements, information, or data associated with a location of a client device 104. The cellular communications system 120 can comprise any of a cellular service tower or an LTE/5G serving cell (collectively referred to herein as a cellular serving cell 150) via a connection 116, a serving mobile location center (SMLC 140) via a connection 142 (such as via a mobility management entity (MME)), or both. The SMLC 140 can be located within or as part of a base station controller (BSC) (not shown). The cellular communications system 120 can generate one or more measurements associated with a location of one or more devices connected to the cellular network, such as access point device 102, by utilizing the cellular serving cell 150. The SMLC 140 can communicate or transmit the location of the access point device 102 to the network resource 118, the management server 110, or both via a cellular connection 144.

The access point device 102 can connect via a connection 106 to one or more network resources 118, such as a database server. The access point device 102 can provide a network resource 118 with client device information, for example, as discussed with reference to FIG. 3. The access point device 102 can connect via a connection 114 to a management server 110, such as a multiple system operator (MSO), an emergency control operator (ECO), a provisioning server, any other management system, or any combination thereof. The management server 110 can perform one or more configurations of the access point device 102, for example, provisioning, remotely enabling and/or disabling one or more location identification features 103, any other configuration for proper operation and performance of the access point device 102, or any combination thereof. The management server 110 can remotely access the network resource 118 via connection 112 so as to store or exchange information associated with the access point device 102.

The one or more connections 108 can be implemented through a wired connection and/or a wireless connection that operates in accordance with, but is not limited to, any IEEE 802.11 protocols. Additionally, the connection 106, 108, 112, 114 and 116 can also be implemented through a wide area network (WAN), a local area network (LAN), a virtual private network (VPN), a metropolitan area networks (MANs), a system area networks (SANs), a data over cable service interface specification (DOCSIS) network, a fiber optics network (e.g., FTTH (fiber to the home) or FTTX (fiber to the x), or hybrid fiber-coaxial (HFC)), a digital subscriber line (DSL), a public switched data network (PSDN), a global Telex network, or a 2G, 3G, 4G, 5G, or 6G network, for example. The connection 108 can also be implemented using a wireless connection in accordance with Bluetooth protocols, BLE, or other short range protocols that operate in accordance with a wireless technology standard for exchanging data over short distances using any licensed or unlicensed band such as citizens broadband radio service (CBRS), 2.4 GHz bands, 5 GHz bands, 6 GHz bands, or 60 GHz bands. One or more of the connections 108 can also be a wired Ethernet connection.

Figure 2:
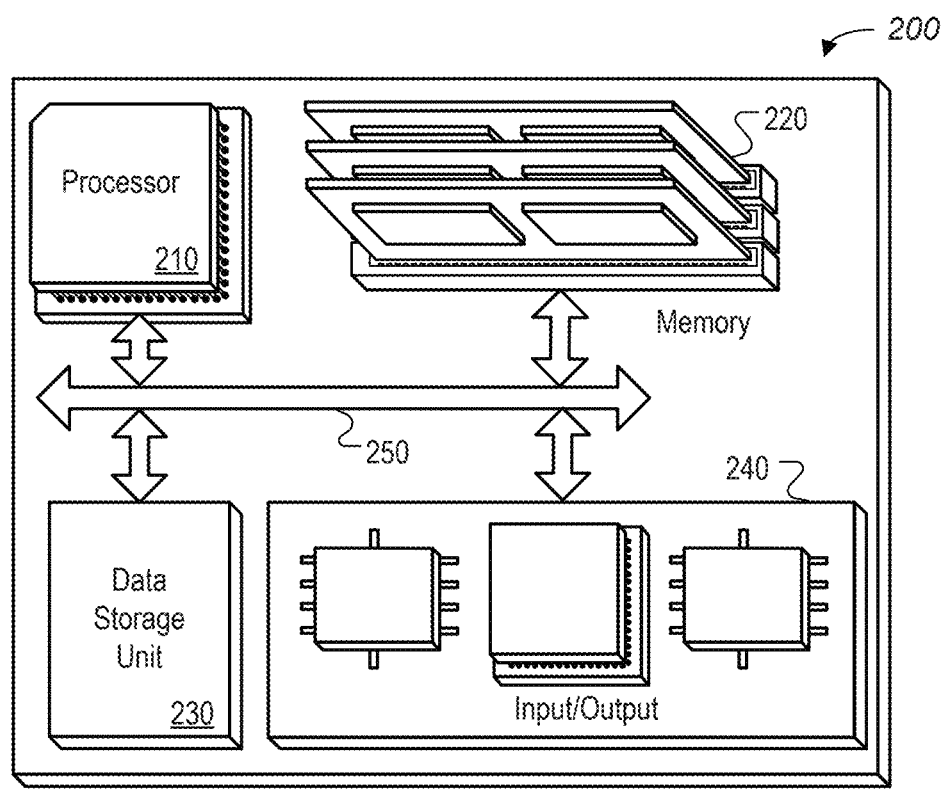
FIG. 2 is a block diagram of a hardware configuration for one or more devices, according to one or more aspects of the present disclosure.

FIG. 2 is a block diagram of a hardware configuration 200 for one or more devices within a network environment 100, for example, for an access point device 102 to determine a location of client device 104. The hardware configuration 200 can comprise a processor 210, a memory 220, a storage device or data storage unit 230, and an input/output (I/O) device 240. Each of the components 210, 220, 230, and 240 can, for example, be interconnected using a system bus 250. The processor 210 can be capable of processing one or more computer-readable instructions for execution within the hardware configuration 200. In one or more embodiments, the processor 210 can be a single-threaded processor. In one or more embodiments, the processor 210 can be a multi-threaded processor. The processor 210 can be capable of processing one or more computer-readable instructions stored in the memory 220 or on the storage device 230.

The memory 220 can store information within the hardware configuration 200. In one implementation, the memory 220 can be a computer-readable medium. In one implementation, the memory 220 can be a volatile memory unit. In another implementation, the memory 220 can be a non-volatile memory unit.

In one or more embodiments, the storage device 230 can be capable of providing mass storage for the hardware configuration 200. In one implementation, the storage device 230 can be a computer-readable medium. In various different implementations, the storage device 230 can, for example, include a hard disk device, an optical disk device, flash memory or some other large capacity storage device. In other implementations, the storage device 230 can be a device external to the hardware configuration 200. One or more location identification features 103 can be stored in the data storage unit 230, the memory 220 or both.

The I/O device 240 provides I/O operations for the hardware configuration 200. In one implementation, the I/O device 240 can include one or more of a network interface device (for example, an Ethernet card), a serial communication device (for example, an RS-232 port), one or more universal serial bus (USB) interfaces (for example, a USB 2.0 port), one or more wireless interface devices (for example, an 802.11 card) for outputting video, voice, and/or data services to a client device 105 of FIG. 1 (for example, television, STB, computer, mobile device, tablet, telephone, wearable, etc.). In embodiments, the I/O device 240 can include one or more driver devices configured to send communications to, and receive communications from one or more networks and/or one or more devices, for example, one or more client device 104, an operator 110, a network resource 118, a cellular communications system 120, or any other device or network.

Figure 3:
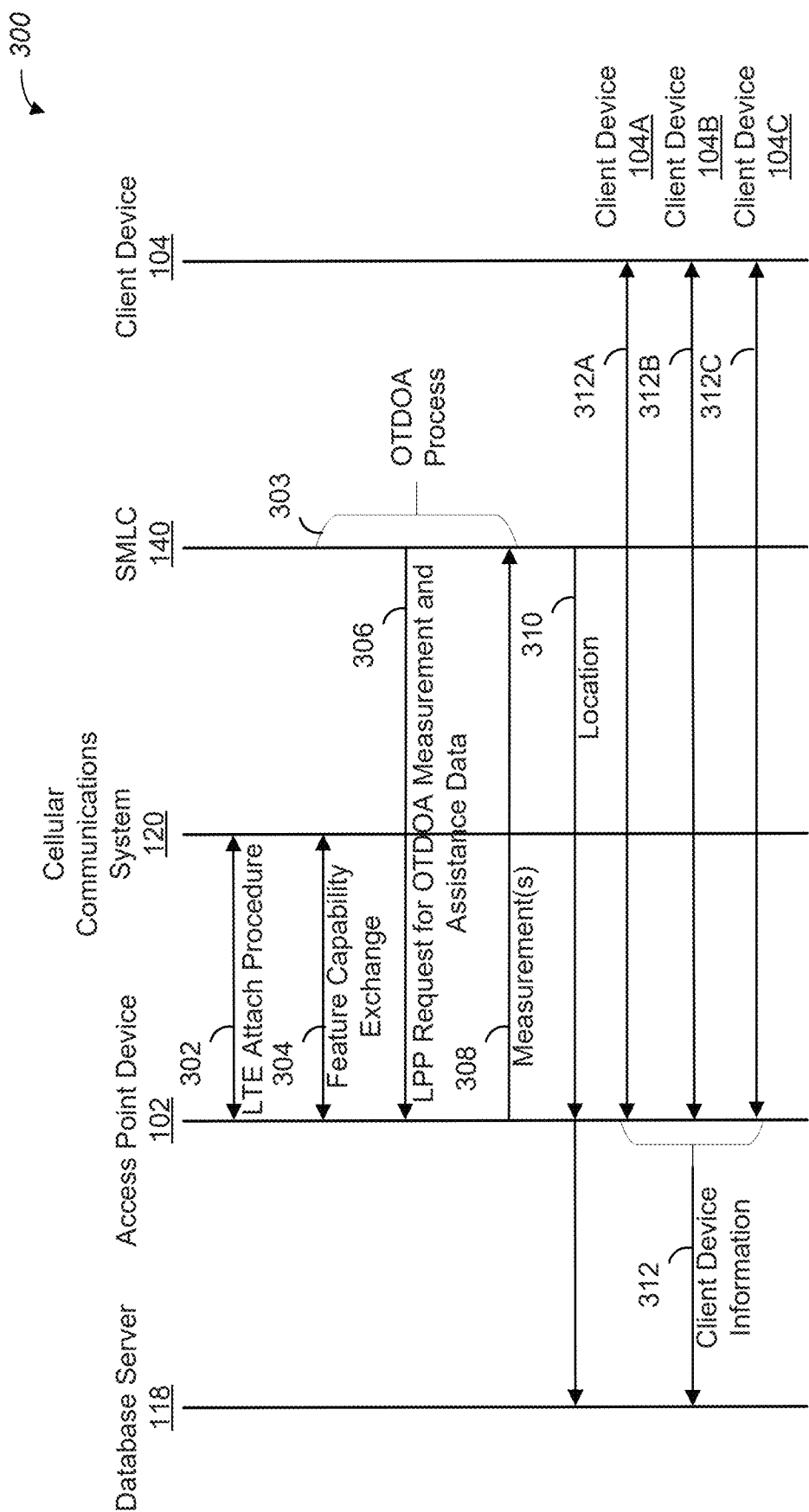
FIG. 3 is a flow diagram for an access point device to provide a location of a client device, according to one or more aspects of the present disclosure.

FIG. 3 is a flow diagram for an access point device 102 to provide a location of one or more client devices 104, according to one or more aspects of the present disclosure. In one or more embodiments, the cellular communications system 120 can comprise a 5G or LTE cellular serving cell 150, SMLC 140, or both. While FIG. 3 illustrates a cellular communications system 120, the present disclosure contemplates utilization of any number of cellular communications systems 120 with one or more location identification features or capabilities. The process begins after a location identification feature 103, for example, the OTDOA feature, is enabled at the access point device 102. The access point device 102 and the cellular communications system 120 perform an LTE attach procedure 302 so as to establish communication between the access point device 102 and the cellular communications system 120. The access point device 102 attaches to the LTE network using 3GPP standards.

With the cellular communications system 120 having the same location identification feature 103 enabled as the access point device 102, the location identification process can begin, for example, an OTDOA process 303. The OTDOA process 303 can comprise elements 304-306. The access point device 102 and the cellular communications system 120 can exchange capabilities 304, such as capabilities associated with one or more location identification features 103. The access point device 102 and the cellular communications system 120 can send one or more communications that indicate capability or support for one or more location identification features 103. For example, the one or more location identification features 103 can indicate that a cell ID process, an E-CID process, and/or as illustrated in the example of FIG. 3 an OTDOA process is supported. The access point device 102 can have a location identification feature 103 enabled and the cellular communications system 120 can have the same location identification feature enabled such that the access point device 102 can receive one or more location parameters 306 from the cellular communications system 120. As an example, the one or more location parameters 306 can be included as part of a network request using an LTE positioning protocol LPP layer for an OTDOA measurement and assistance data. For example, the assistance data can comprise a list of cells (eNodeBs) with corresponding Positioning Reference Signal (PRS) parameters (such as bandwidth and periodicity). The OTDOA measurement can comprise a set of reference signal time difference (RSTD) measurements from the access point device 102. To complete the OTDOA process 303, the access point device 102 sends one or more measurements 308 to the SMLC 140. The access point device 102 can estimate the time offsets between the PRS from different cells (eNodeBs) during a given period of time (such as eight or sixteen periods of the PRS signals). In one or more embodiments, the one or more measurements 308 can include an estimate of the measurement quality. The one or more measurements 308 can be indicative of a location determined by the access point device based on the one or more location parameters 306.

The SMLC 140 can send the location 310 to a network resource 118 (such as a database server), a management server 110 or both. The location 310 can be the location determined by the access point device and communicated to the SMLC 140 as part of the one or more measurements 308, a location determined by the SMLC based on the one or more measurements 308, or both. In one or more embodiments, one or more location parameters 306 used to determine a location of the access point device 102, whether determined by the access point device 102 and/or other associated device, can comprise one or more times offsets between the PRS from different cells, one or more positions or locations corresponding to the one or more cells (eNodeBs), one or more transmit time offsets associated with the one or more cells (eNodeBs), or any combination thereof.

Communications 312A, 312B, and 312C are sent between the access point device 102 and any one or more of client device 104A, client device 104B and client device 104C, respectively. The one or more client devices 104 can be non-LTE devices such that each client device 104 does not have location identifier capability. The access point device 102 is associated with each client device 104 such that the access point device 102 can receive information associated with each client device 104. The access point device 102 can use the communications 308 to identify each client device 104 associated with the access point device 102 such that while the client devices 104 are non-LTE devices each has Wi-Fi capability or a wired connection so as to connect to the access point device 102.

The access point device 102 determine a location of the access point device 102 based on one or more location parameters 306 received from the cellular communications system 120. This location can then be assigned or correlated with each client device 104. For example, the access point device 102 can send client device information 312 to a database server 118. The client device information 312 can comprise the location 310 as well as any other information associated with the client device, including, but not limited to, any of a serial number of a customer or user, a name of a customer or user, a registered address, a current address, client information, a media access control (MAC) address, a data volume, a device type, a device name, any other information, or any combination thereof.

As an example, a client device 104 can be identified by a user as a lost device. The client device 104 can be wireless network device that does not include LTE capability (a non-LTE device). The access point device 102 can provide a location for the client device 104 based on the process discussed with reference to FIG. 3, for example, based on the one or more location parameters received from a cellular communications system 120 and information received from or associated with the client device 104 (such as a MAC address).

As an example, a location of client device 104 that does not support LTE can be provided by an access point device can be utilized by online delivery applications. An online delivery application can operate from a stationary device (such as a desktop or a laptop) and include a location sharing option so that the location can be provided for a delivery. In this way, a user can share the location from an application executing on a client device 104 that does not support LTE and cannot otherwise provide a GPS-type location by utilizing the location provided by an access point device 102 connected to the client device 104.

As an example implementation of the process discussed in reference to FIG. 3, the location of a user (such as an elderly person or a child) can be tracked when the user is associated with a client device 104 that is connected to access point device 102. For example, a client device 104, such as any of a smart watch, a laptop, an IoT device, any other wireless non-LTE network device, or any combination thereof, can be connected to an access point device 102 (such as a gateway) via a Wi-Fi connection. The user can automatically send an alert to the mobile number of an administrator (that is stored at the access point device 102 and/or retrievable from a network resource 118) via the access point device 102 with the location of the user as determined by the access point device 102 based on the process of FIG. 3. In one or more embodiments, the location of the user can be further refined by the access point device 102 by mapping a received signal strength indicator (RSSI). In one or more embodiments, the access point device 102 can monitor the activity or movement of a user based on the RSSI value such that if the RSSI value of a client device 104 is varying then the access point device 102 can determine that the user is active or transitioning from one location to another or if the RSSI value of a client device 104 remains substantially the same access point device 102 can determine that the user is inactive or stationary.

As an example implementation of the process discussed in reference to FIG. 3, the location determined by the access point device 102, for example, as determined by the process of FIG. 3, can be used to generate a heat map. In one or more embodiments, the heat map can be generated by any of the access point device 102, a network resource 118, another network device that receives the location from the access point device 102, or any combination thereof. A heat map can be generated to identify an area-wise customer penetration that could be utilized by a sales or marketing team to enhance or improve services in a less concentrated areas or to identify one or more hotspots (such as based on location-wise data usage), user density in a commercial and/or residential area, a high throughput zone, a low throughput zone, a high user complaint zone, any other heat map-based identification, or any combination thereof. The zones of the heat map can be based on the determination of a location of one or more client devices 104 by any one or more access point devices 102.

As an example implementation of the process discussed in reference to FIG. 3, the location determined by the access point device 102 based on the process of FIG. 3 can be used to send information which is geographically customer-centric, such as any of a planned service outage or service in a particular area, a planned software upgrade, a security warning, any other location specific information, or any combination thereof. In this way, the information is only sent to those client devices 104 that are within a specific range of locations or area. For example, sending a inclement weather warning to a client device 104 that is not within the zone of the inclement weather can unduly cause panic, confusion, or uncertainty whereas a targeted message to specific client devices 104 based on the location determined by one or more access point devices 102 (and, for example, communicated to a network resource 118) can provide important information to the intended or the target client devices 104 instead of broadcasting to an entire area that includes one or more client devices 104 outside the zone or location of interest.

As an example implementation of the process discussed in reference to FIG. 3, the location determined by the access point device 102 based on the process of FIG. 3 can be used to identify a particular user associated with an issue, such as a customer complaint. Instead of dispersing one or more resources to multiple locations with a zone, the one or more resources can be target to a specific location. For example, a user can send a complaint regarding a particular issue. A resource can be directed to the location identified by the access point device 102 (an apartment building or office) associated with the client device 104 corresponding to the user so that the issue can be addressed without sending resources to an entire zone (such as a city block) to ascertain the location of the issue.

Figure 4:
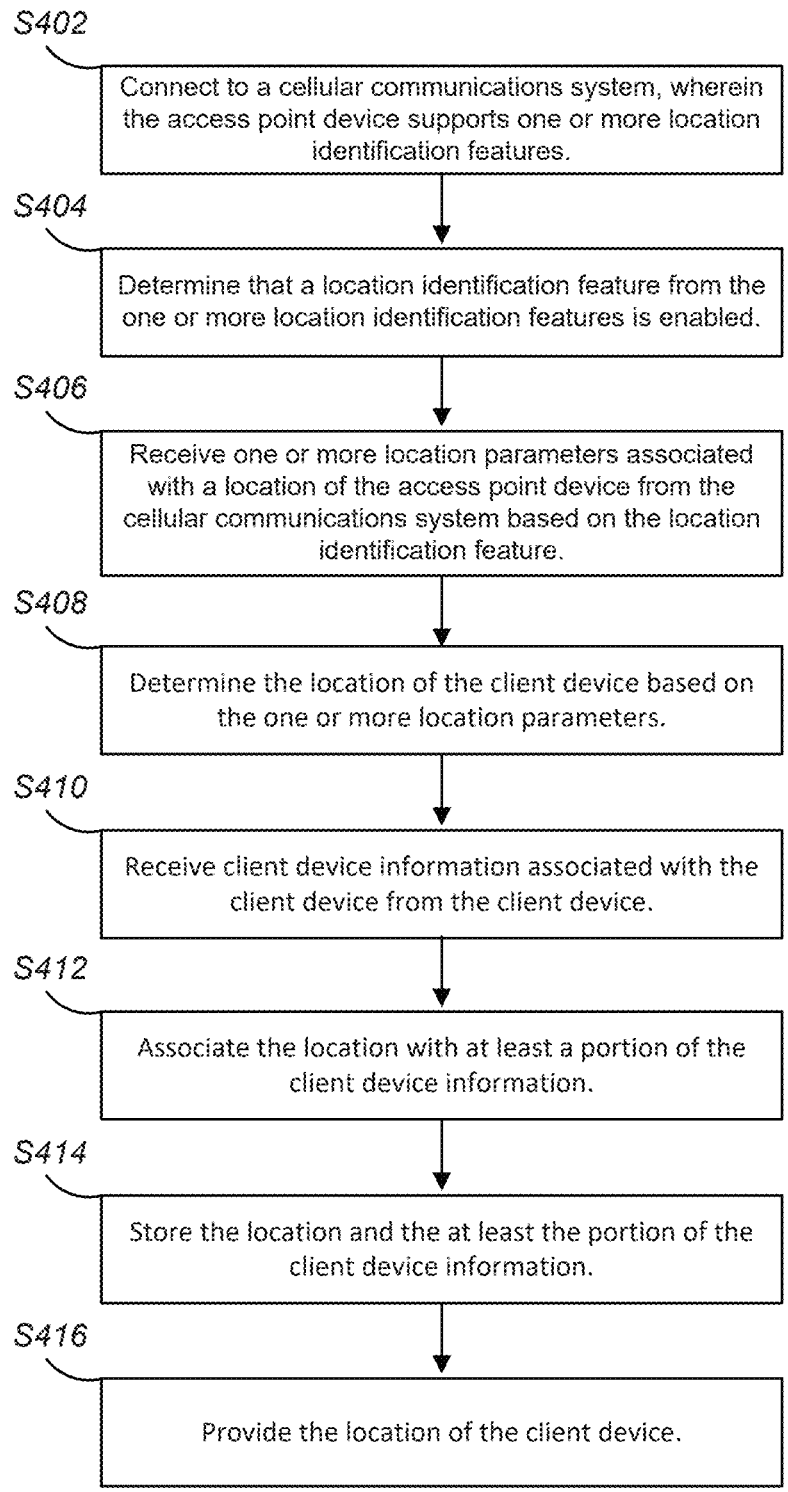
FIG. 4 is a flowchart for a method of an access point device to provide a location of a client device, according to one or more aspects of the present disclosure.

FIG. 4 is a flowchart for a method of an access point device to provide a location of a client device, according to one or more aspects of the present disclosure. In FIG. 4, it is assumed that the devices include their respective controllers and/or processors and their respective software (such as one or more computer-readable instructions) stored in their respective memories, as discussed above in reference to FIGS. 1-3, which when executed by their respective controllers perform one or more functions or operations in accordance with the example embodiments of the present disclosure.

The processor 210 executes one or more computer-readable instructions, stored in a memory, for example, a memory 220 of an access point device 102, that when executed by the processor 210 perform one or more of the operations of steps S402-S416. In one or more embodiments, the one or more computer-readable instructions may be one or more software applications. While the steps S402-S416 are presented in a certain order, the present disclosure contemplates that any one or more steps can be performed simultaneously, substantially simultaneously, repeatedly, in any order or not at all (omitted).

At step S402, the access point device 102 connects to the cellular communications system 120, for example, the access point device 102 is an LTE capable device the cellular communications system 120 is an LTE and/or a 5G system. The access point device 102 and the cellular communications system 120 have one or more location identification features enabled such that a location can be determined based on the location identifier feature that is enabled, such as based on OTDOA.

At step S404, the access point device 102 determines that a location identification feature from the one or more location identification features is enabled. For example, a location identification feature can be enabled by an administrator or other user. In one or more embodiments, the location identification feature is enabled remotely via a management server 110. In one or more embodiments, the access point device 102 and the cellular communications system 120 exchange capabilities such that the access point device 102 can determine that the cellular communications system 120 has the same location identification feature enabled or capability so as to be capable of providing one or more location parameters associated with the location of the access point device 102 to the access point device 102. In one or more embodiments, the location identification can indicate support for any one or more location identification processes such as an OTDOA process.

At step S406, the access point device 102 receives one or more location parameters associated with the location of the access point device from the cellular communications system based on the location identification feature. For example, the cellular communications system 120 can routinely, periodically or upon request transmit or broadcast the one or more location parameters to the access point device 102. In one or more embodiments, the cellular communications system 120 comprises an LTE system.

At step S408, the access point device 102 determines the location of the client device 104 based on the one or more location parameters. For example, the access point device 102 can determine that the location of the access point device 102 based on the one or more location parameters is the location of the client device 104. As another example, the access point device 102 can determine a location of the client device 104 based on the one or more location parameters and any of client device information received from the client device 104, network data, data received from an administrator or user (for example, during initialization, setup, or onboarding of the client device 104), or any combination thereof. As another example, the access point device 102 can send or store the one or more location parameters, client device information received from the client device 104, or both at a network resource 118 such that a management server 110 can use the data stored at the network resource 118 and/or communicated to the management server 110 (such as the one or more location parameters, the client device information, or both) to determine a location of the access point device 110. The access point device 102 can retrieve or receive the location from the management server 110.

At step S410, the access point 102 device receives client device information associated with the client device 104 from the client device 104. The client device information can include any of the information discussed with reference to FIG. 3 or any other information associated with the client device 104.

At step S412, the access point device 102 associates the location determined by the access point device 102 with at least a portion of the client device information received from the client device 104. For example, the access point device 102 can associate the location with a unique identifier of the client device 104 and/or any other or all of the client device information received.

At step S414, the access point device 102 stores the location and at least the portion of the client device information, for example, in a memory 220, a database server or network resource 118, or both. In one or more embodiments, the stored location and at least the portion of the client device information can be retrieved by a management server 110 for use by an administrator or user in locating a particular client device 104. For example, the location can be stored in a database of a database server as associated with the client device 104 along with any client device information and/or other information.

At S416, the access point device 102 can provide the location of the client device. Providing the location can comprise providing the location along with any other associated or corresponding client device information. For example, the access point device 102 can provide the location of the client device 104 to a display or external monitor, to a network resource 118, a management server 110, a cellular communications system 120, any other network device, a user, or any combination thereof. The access point device 102 can provide the location in response to a request from any of a user, a network resource 118, a management server 110, a cellular communications system 120, any other network device, and any combination thereof.

By implementing the processes discussed with reference to FIGS. 3 and/or 4, one or more resources, such as costs, labor, and/or time, can be conserved and quality of service improved.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method for an access point device to provide a location of a client device connected to the access point device, the method comprising:
   connecting to a cellular communications system, wherein the access point device and the cellular communications system supports one or more location identification features;
   determining that a location identification feature from the one or more location identification features is enabled;
   receiving one or more location parameters associated with a location of the access point device from the cellular communications system based on the location identification feature;
   determining the location of the client device based on the one or more location parameters; and
   providing the location of the client device.

2. The method of claim 1, wherein the cellular communications system comprises a long term evolution (LTE) system.

3. The method of claim 1, wherein the location identification feature indicates support for an observed time difference of arrival (OTDOA) process.

4. The method of claim 1, further comprising:
   receiving client device information associated with the client device from the client device;
   associating the location with at least a portion of the client device information; and
   storing the location and the at least the portion of the client device information.

5. The method of claim 4, wherein the client information comprises at least one of a serial number, a customer name, a registered address, a current address, a data volume, a media access control (MAC) address, a device type, and a device name.

6. The method of claim 4, wherein storing the location and the at least the portion of the information comprises:
   sending at least one of the one or more location parameters and the at least the portion of the client device information to a network resource connected to the access point device.

7. The method of claim 6, wherein determining the location comprises receiving from a management server the location based on the one or more location parameters.

8. An access point device for providing a location of a client device, the access point device comprises:
   a memory storing one or more computer-readable instructions; and
   a processor connected to the memory, the processor configured to execute the one or more computer-readable instructions to:
      connect to a cellular communications system, wherein the access point device and the cellular communications system supports one or more location identification features;
      determine that a location identification feature from the one or more location identification features is enabled;
      receive one or more location parameters associated with a location of the access point device from the cellular communications system based on the location identification feature;
      determine the location of the client device based on the one or more location parameters; and
      provide the location of the client device.

9. The access point device of claim 8, wherein the cellular communications system comprises a long term evolution (LTE) system.

10. The access point device of claim 8, wherein the location identification feature indicates support for an observed time difference of arrival (OTDOA) process.

11. The access point device of claim 8, wherein the processor is further configured to execute the one or more instructions to:
   receive client device information associated with the client device from the client device;
   associating the location with at least a portion of the client device information; and
      storing the location and the at least the portion of the client device information.

12. The access point device of claim 11, wherein the client information comprises at least one of a serial number, a customer name, a registered address, a current address, a data volume, a media access control (MAC) address, a device type, and a device name.

13. The access point device of claim 11, wherein storing the location and the at least the portion of the information comprises:
sending at least one of the one or more location parameters and the at least the portion of the client device information to a network resource connected to the access point device.

14. The access point device of claim 13, wherein determining the location comprises receiving from a management server the location based on the one or more location parameters.

15. A non-transitory computer readable medium of an access point device having one or more computer-readable instructions stored thereon, that when executed by a processor cause the access point device to perform one or more operations comprising:
connecting to a cellular communications system, wherein the access point device and the cellular communications system supports one or more location identification features;
determining that a location identification feature from the one or more location identification features is enabled;
receiving one or more location parameters associated with a location of the access point device from the cellular communications system based on the location identification feature;
determining the location of the client device based on the one or more location parameters; and
providing the location of the client device.

16. The non-transitory computer-readable medium of claim 15, wherein the location identification feature indicates support for an observed time difference of arrival (OTDOA) process.

17. The non-transitory computer-readable medium of claim 15, wherein the one or more computer-readable instructions further cause the access point device to perform one or more further operations comprising at least one of:
receiving client device information associated with the client device from the client device;
associating the location with at least a portion of the client device information; and
storing the location and the at least the portion of the client device information.

18. The non-transitory computer-readable medium of claim 17, wherein the client information comprises at least one of a serial number, a customer name, a registered address, a current address, a data volume, a media access control (MAC) address, a device type, and a device name.

19. The non-transitory computer-readable medium of claim 15, wherein storing the location and the at least the portion of the information comprises:
sending at least one of the one or more location parameters and the at least the portion of the client device information to a network resource connected to the access point device.

20. The non-transitory computer-readable medium of claim 19, wherein determining the location comprises receiving from a management server the location based on the one or more location parameters.

* * * * *